(12) United States Patent
Isaji et al.

(10) Patent No.: US 8,452,514 B2
(45) Date of Patent: May 28, 2013

(54) DEVICE FOR EXECUTING PRECEDING VEHICLE FOLLOWING DRIVING CONTROL

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/448,742

(22) Filed: Apr. 17, 2012

(65) Prior Publication Data

US 2012/0277967 A1    Nov. 1, 2012

(30) Foreign Application Priority Data

Apr. 27, 2011    (JP) ................................ 2011-099199

(51) Int. Cl.
*B60W 30/16*    (2006.01)
*B60W 10/06*    (2006.01)
*B60W 10/184*    (2012.01)

(52) U.S. Cl.
USPC .............. 701/96; 701/408; 701/414; 318/580

(58) Field of Classification Search
USPC ............. 701/96, 408, 414, 422, 423; 318/580
See application file for complete search history.

(56) References Cited

U.S. PATENT DOCUMENTS

2008/0288152 A1   11/2008   Isaji et al.
2009/0265071 A1*   10/2009   Isaji et al. ...................... 701/70

FOREIGN PATENT DOCUMENTS

JP    3889131    12/2006
JP    2008-280017    11/2008
JP    2009-113763    5/2009

* cited by examiner

*Primary Examiner* — Mary Cheung
*Assistant Examiner* — Brian P Sweeney
(74) *Attorney, Agent, or Firm* — Harness, Dickey & Pierce, PLC (57) ABSTRACT

A device executes a preceding vehicle following driving control and successively calculates a friction-braking-start threshold value, an engine-braking-start threshold value, an acceleration-control-completion threshold value by using equations L1, L2 and L3, respectively. The device uses a constant vehicle speed zone determined between the engine-braking-start threshold value and the acceleration-control-completion threshold value. When a compensated-evaluation-index value $KdB\_c$ of a vehicle distance between the own vehicle and a preceding vehicle is within the constant vehicle speed zone, the device drives the own vehicle at a constant speed. This control suppresses fuel consumption because of decreasing an acceleration and deceleration frequency of the own vehicle. Decreasing the deceleration frequency makes it possible to provide good vehicle following because less frequent acceleration is needed for following the preceding vehicle even if another vehicle cuts in between the own vehicle and the preceding vehicle or the preceding vehicle accelerates after decelerating.

4 Claims, 6 Drawing Sheets

CURRENT COMPENSATED EVALUATION INDEX VALUE KdB_c

KdB_c [dB]

VEHICLE DISTANCE D [m]

FIG.8D ns a vehicle distance between the own vehicle and a preceding vehicle, Vr indicates a relative speed of a current speed of the own vehicle to a vehicle speed of the preceding vehicle, a indicates a multiplier, and p indicates a vehicle speed of the preceding vehicle.

$$KdB = 10 \times \log\left(\left|4 \times 10^7 \times \frac{Vr}{D^3}\right|\right). \quad (1)$$

$$KdB\_c = 10 \times \log\left(\left|4 \times 10^7 \times \frac{Vr - aVp}{D^3}\right|\right). \quad (2)$$

In the above equations (1) and (2), the more the absolute value of the relative speed Vr when the own vehicle approaches the preceding vehicle is increased, the more the compensated evaluation index value KdB_c is increased. Further, the more the vehicle speed Vp of the preceding vehicle is increased, the more the compensated evaluation index value KdB_c is decreased. Still further, the more the vehicle distance D between the own vehicle and the preceding vehicle is decreased, the more the compensated evaluation index value KdB_c is increased.

Because the vehicle distance D is a cube of D in the equations (2), the more the vehicle distance D is decreased, the more a slope of increasing the compensated evaluation index value KdB_c to the change in decreasing the vehicle distance D is increased.

The conventional device and method disclosed in the third conventional patent document executes the following driving control of the own vehicle on the basis of the compensated evaluation index value KdB_c, it is possible for the driver of the own vehicle to comfortably follow the preceding vehicle.

However, the device, disclosed in the first conventional patent document, decreases the current vehicle speed of the own vehicle to a vehicle speed of another vehicle on the basis of a deceleration speed obtained by a control model when the current vehicle distance is decreased less than a preset vehicle distance when another vehicle cuts in between the preceding vehicle and the own vehicle or the vehicle speed of the preceding vehicle is decreased. This control makes it possible to maintain a safe vehicle distance between the own vehicle and the preceding vehicle or between the own vehicle and the other vehicle when the other vehicle cuts in between the own vehicle and the preceding vehicle, and the other vehicle becomes a new preceding vehicle on the same lane or when the preceding vehicle is decelerated.

However, when the other vehicle or the preceding vehicle is accelerated, the vehicle distance between the own vehicle and the preceding vehicle is increased, and the device instructs the own vehicle to accelerate its driving speed. This consumes fuel and decreases the fuel consumption. Through the specification, the "fuel consumption" can be adapted to electric vehicles which are propelled by electric motor(s), using electrical energy stored in batteries or another energy storage device.

Because the device disclosed in the second conventional patent document controls the vehicle speed of the own vehicle so that the vehicle distance between the own vehicle and the preceding vehicle is always kept at a constant distance, the device decelerates the vehicle speed of the own vehicle in order to maintain a constant vehicle distance between the own vehicle and the preceding vehicle when another vehicle cuts in between the own vehicle and the preceding vehicle or when the preceding vehicle decelerates. Accordingly, when the preceding vehicle or the other vehicle accelerates its vehicle speed and the vehicle distance between the own vehicle and the preceding vehicle is increased, the device also accelerates the current vehicle speed of the own vehicle. This control also increases the fuel consumption of the own vehicle because of executing acceleration and deceleration many times.

Still further, the device disclosed in the second conventional document can suppress the fuel consumption from being increased when the device selects the fuel-consumption reduction drive mode. However, this following driving control mode suppresses the own vehicle from being accelerated, and this control mode may deteriorate the following driving of the own vehicle to the preceding vehicle.

The device disclosed in the third conventional patent document detects the timing to accelerate or decelerate the vehicle speed of the own vehicle on the basis of the compensated evaluation index value KdB_c, as previously explained. However, the compensated evaluation index value KdB_c is also increased when the preceding vehicle decelerates its vehicle speed or when another vehicle cuts in between the own vehicle and the preceding vehicle, the device decelerates the own vehicle in order to decrease the compensated evaluation index value KdB_c. After this control, when the other vehicle or the preceding vehicle decelerates its vehicle speed, the device accelerates the own vehicle in order to increase the compensated evaluation index value KdB_c. As previously explained, the devices disclosed in the third conventional patent document, like the devices disclosed in the first and second conventional patent documents, deteriorate the fuel consumption because of executing frequently deceleration and acceleration of the own vehicle.

SUMMARY

It is therefore desired to provide a preceding vehicle following driving control device capable of reducing a fuel consumption of an own vehicle and of following the preceding vehicle with high efficiency. The preceding vehicle following driving control device controls an own vehicle to correctly follow the preceding vehicle in order to maintain a safe vehicle distance between the own vehicle and the preceding vehicle and to comfortably follow the preceding vehicle.

An exemplary embodiment provides a device for executing a preceding vehicle following driving control using a compensated evaluation index value KdB_c and other functions. The device has a memory unit, a current value calculation unit, a threshold value calculating unit and a speed control unit.

The compensated evaluation index value KdB_c is obtained by compensating an evaluation index value KdB. The evaluation index value KdB is an index value of indicating an area changing rate of an object per unit time. The object is present in front of an own vehicle and seen by the driver of the own vehicle. For example, the object is a preceding vehicle which is running in front of the own vehicle on the same lane of a road. The memory unit stores a braking start threshold value equation and an acceleration control completion threshold value equation. The braking start threshold value equation and the acceleration control completion threshold value equation are obtained by adding a different offset value to a braking judgment equation, respectively. The braking judgment equation indicates a relationship between the compensated evaluation index value KdB_c and the vehicle distance at a timing when the driver of the own vehicle executes a braking operation. The braking start threshold value equation is obtained by adding a braking offset value to the braking judgment equation. The braking offset value decreases the compensated evaluation index value KdB_c when the vehicle distance is constant. That is, the braking start threshold value equation shows the relationship between the compensated evaluation index value KdB_c and the vehicle distance at a start timing of the braking control.

The acceleration control completion threshold value equation is obtained by adding an acceleration offset value to the braking judgment equation. The acceleration offset value further decreases the compensated evaluation index value KdB_c, more than the decrease of the compensated evaluation index value KdB_c by using the braking offset value, in a case having the same vehicle distance.

The acceleration control completion threshold value equation indicates a relationship between the compensated evaluation index value KdB_c and the vehicle distance at a completion of the acceleration control. The current value calculation unit successively calculates a current compensated evaluation index value KdB_c.

The threshold value calculating unit calculates a braking start threshold value by using the braking start threshold value equation and the current vehicle distance, and for calculating an acceleration control completion threshold value by using the acceleration control completion threshold value equation and the current vehicle distance. The speed control unit compares the current compensated evaluation index value KdB_c calculated by the current value calculation unit with the braking start threshold value calculated by the threshold value calculation unit and the acceleration control completion threshold value calculated by the threshold value calculation unit.

The speed control unit applies a braking in the own vehicle when the comparison result indicates that the current compensated evaluation index value KdB_c is larger than the braking start threshold value. The speed control unit executes an acceleration control of the own vehicle when the comparison result indicates that the current compensated evaluation index value KdB_c is smaller than the acceleration control completion threshold value. The speed control unit drives the own vehicle at a constant speed when the current compensated evaluation index value KdB_c is within the braking start threshold value and the acceleration control completion threshold value.

By the way, in the preceding vehicle following driving control using a conventional compensated evaluation index value, a conventional device decelerates the own vehicle when a current compensated evaluation index value exceeds a threshold value, and accelerates the own vehicle when the current compensated evaluation index value is not more than the threshold value. That is, the conventional device cannot control and provide the constant-speed drive of the own vehicle.

On the other hand, the device, according to the exemplary embodiment having the structure previously described and will be explained later in the embodiment section, uses the braking start threshold value and the acceleration control completion threshold value, and controls that the own vehicle drives at a constant speed when the current compensated evaluation index value KdB_c is within the braking start threshold value and the acceleration control completion threshold value. As a result, the device drives the own vehicle at a constant speed. This control suppresses fuel consumption because of decreasing an acceleration-deceleration frequency of the own vehicle. Decreasing the deceleration frequency makes it possible to provide the good following drive to the driver of the own vehicle because a less frequency of acceleration and deceleration is needed for following the preceding vehicle even if another vehicle cuts in between the own vehicle and the preceding vehicle or the preceding vehicle accelerates after decelerates.

BRIEF DESCRIPTION OF THE DRAWINGS

A preferred, non-limiting embodiment of the present invention will be described by way of example with reference to the accompanying drawings, in which:

FIG. 4A to FIG. 4F are views, each showing an example of an own vehicle controlled by the preceding vehicle following driving control device according to the exemplary embodiment of the present invention, in which a current compensated evaluation index value KdB_c of a safe vehicle distance between the own vehicle and the preceding vehicle becomes within a constant speed zone when another vehicle cuts in between the own vehicle and the preceding vehicle;

FIG. 5A to FIG. 5G are views, each showing an example of the own vehicle controlled by the preceding vehicle following driving control device according to the exemplary embodiment of the present invention, in which a current compensated evaluation index value KdB_c is close to the friction braking start threshold value when compared with the example shown in FIG. 4A to FIG. 4F;

FIG. 6A to FIG. 6G are views, each showing an example of the own vehicle controlled by the preceding vehicle following driving control device according to the exemplary embodiment of the present invention, in which a current compensated evaluation index value KdB_c is within the engine braking start threshold value by the presence of another vehicle (as the preceding vehicle P2) which curs between the own vehicle O and the preceding vehicle P1;

FIG. 7A to FIG. 7G are views, each showing an example of the own vehicle controlled by the preceding vehicle following driving control device according to the exemplary embodiment of the present invention, in which a current compensated evaluation index value KdB_c exceeds the friction braking start threshold value by the presence of another vehicle which curs between the own vehicle and the preceding vehicle; and FIG. 8A to FIG. 8D are views, each showing an example of the own vehicle controlled by the preceding vehicle following driving control device according to the exemplary embodiment of the present invention, in which the own vehicle is decelerated by using the friction braking within a safe vehicle distance between own vehicle and the preceding vehicle.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a preceding vehicle following driving control device according to an exemplary embodiment of the present invention with reference to FIG. 1 to FIGS. 8A-8D.

Figure 1:
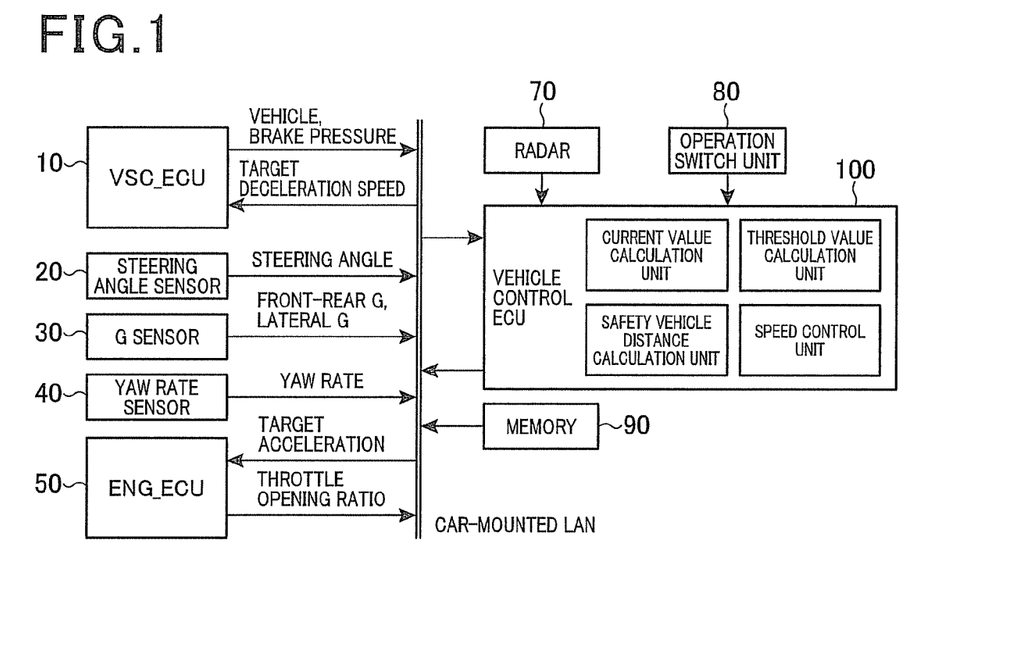
FIG. 1 is a view showing a schematic structure of a preceding vehicle following driving control device according to an exemplary embodiment of the present invention.

FIG. 1 is a view showing a schematic structure of the preceding vehicle following driving control device according to the exemplary embodiment of the present invention. As shown in FIG. 1, the preceding vehicle following driving control device has an electric control unit 10 for vehicle stability control which will be referred to as the "VCS_ECU 10", a steering angle sensor 20, a gravitation sensor (G sensor) 30, a yaw rate sensor 40, an engine electric control unit 50 (ENG_ECU 50), a radar 70, an operation switch unit SW80, and a vehicle control ECU 100.

The VCS_ECU 10 controls braking actuators (not shown). The braking actuators supply a braking force to the own vehicle. The VCS_ECU 10 has a function of vehicle stability control ("VSC" is a registered trademark) capable of suppressing the own vehicle from skidding. The VCS_ECU 10 receives information with regard to a target deceleration speed through a car-mounted local area network (car-mounted LAN), and controls the braking actuators so as to generate a target deceleration speed in the own vehicle. When the braking actuators operate, friction braking is applied in the wheels of the own vehicle. The VCS_ECU 10 transmits information regarding vehicle speed V0 and the generated braking pressure, etc. of the own vehicle to the car-mounted LAN. The steering sensor 20 is a sensor capable of detecting a steering angle of the steering wheel of the own vehicle and transmits the information regarding the detected steering angle to the car-mounted LAN.

The G sensor 30 is a sensor capable of detecting an acceleration (front and rear G) generated in a preceding and reverse direction of the own vehicle and an acceleration (lateral G) generated in a lateral direction (right and left sides). The G sensor 30 transmits information regarding the detected front and rear G and lateral G to the car-mounted LAN.

The yaw rate sensor 40 is a sensor capable of detecting an angular velocity (yaw rate) of the own vehicle around a vertical direction of the own vehicle. The yaw rate sensor 40 transmits the information regarding the detected yaw rate to the car-mounted LAN.

The ENG_ECU 50 receives information regarding a target acceleration transmitted from the car-mounted LAN, and controls the throttle actuator (not shown) in order for the own vehicle to reach the target accelerator. Further, when receiving the information regarding a target deceleration, the ENG_ECU 50 controls the throttle actuator (not shown) in order to generate and apply engine braking.

The radar 70 irradiates laser light into a predetermined zone in front of the own vehicle and receives the laser light reflected by obstacles such as preceding vehicles and traffic signs, etc. The radar 60 detects a vehicle distance D between the own vehicle and the preceding vehicle, a relative speed Vr of the own vehicle to a vehicle speed of the preceding vehicle, and a lateral error between a central axis of the width of the own vehicle and a central axis of the width of the preceding vehicle on the basis of a difference between the transmitted laser light and the reflected laser light. The radar 70 transmits the detection data to the vehicle control ECU 100.

The operation switch unit SW80 has a plurality of operation units. The driver of the own vehicle operates the operation switch unit SW 80. The information of the driver's operation to the operation switch unit SW80 is transmitted to the vehicle control ECU 100. It is possible for the driver of the own vehicle to operate the operation switch unit SW80 in order to change various off-set values. Those operations will be explained later.

A compensated evaluation index value KdB_c is an index which is obtained by compensating an evaluation index value KdB in consideration with a vehicle speed of a preceding vehicle which is running in front of the own vehicle on the same lane of a road. The evaluation index value KdB is an index capable of indicating an area change rate of an object per unit time which is observed by the driver of the own vehicle. That is, the object is present in front of the own vehicle and now seen by the driver of the own vehicle.

In other words, the preceding vehicle following driving control is executed on the basis of using the compensated evaluation index value KdB_c. The compensated evaluation index value KdB_c shows a state of the vehicle distance between the own vehicle and the preceding vehicle. The compensated evaluation index value KdB_c is increased according to increase of the relative speed. The relative speed indicates a rate of a vehicle speed of the own vehicle to approach the preceding vehicle. The compensated evaluation index value KdB_c is increased according to decrease of the vehicle distance between the own vehicle and the preceding vehicle. The increasing gradient of the compensated evaluation index value KdB_c to a decreasing gradient of the vehicle distance is high according to decrease of the vehicle distance.

The memory 90 corresponds to a storage unit written in the claims. The memory 90 stores three threshold equations. The three threshold equations are a friction braking start threshold value equation, an engine braking start threshold value equation and an acceleration control completion threshold value equation. Each of the three equations is obtained by adding a corresponding offset value to a braking judgment equation. The braking judgment equation is expressed by the following equation (3). The braking judgment equation (3) is a function of the compensated evaluation index value KdB_c.

$$Kdb\_c(a) = b \log_{10} D + c \qquad (3).$$

The braking judgment equation (3) expresses a relationship between the compensated evaluation index value KdB_c at the time when the driver of the own vehicle starts the braking operation and the vehicle distance D between the own vehicle and the preceding vehicle. In the braking judgment equation (3), reference characters "a", "b" and "c" designate 0.2, −22.66 and 74.71, respectively.

Since the braking judgment equation is expressed by the equation (3), the friction braking start threshold equation, the engine braking start threshold equation and the acceleration control completion threshold equation can be expressed by the following equation (4).

$$Kdb\_c(a) = b \log_{10} D + c + \Delta c \qquad (4),$$

where $\Delta c$ indicates an offset value.

For example, the friction braking start threshold equation uses a first braking offset value $\Delta c1$, the engine braking start threshold equation uses a second braking offset value $\Delta c2$, and the acceleration control completion threshold equation uses an acceleration offset value $\Delta c3$. For example, the first braking offset value $\Delta c1$ is −3 dB, the second braking offset value $\Delta c2$ is −4 dB, and the acceleration offset value $\Delta c3$ is −6 dB.

Figure 2:
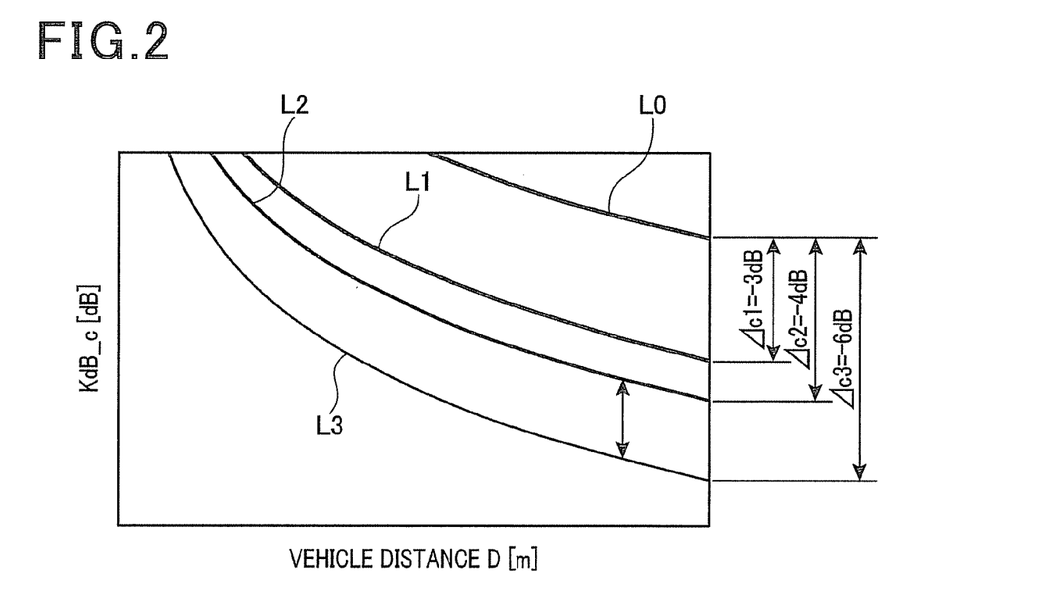
FIG. 2 is a view showing a braking judgment equation curve L0, a friction braking start threshold curve L1, an engine braking start threshold curve L2, and an acceleration control completion threshold curve L3.

FIG. 2 is a view showing a braking judgment equation curve L0, a friction braking start threshold curve L1, an engine braking start threshold curve L2, and an acceleration control completion threshold curve L3.

That is, FIG. 2 shows the relationship between four curves L0, L1, L2 and L3. That is, in FIG. 2, the braking judgment equation (3) which shows the braking judgment equation curve L0, the friction braking start threshold equation which shows the friction braking start threshold curve L1, the engine braking start threshold equation which shows the engine braking start threshold curve L2, and the acceleration control completion threshold equation which shows the acceleration control completion threshold curve L3.

As can be understood from the curves L1, L2, and L3 shown in FIG. 2, the compensated evaluation index value KdB_c of the vehicle distance between the own vehicle and the preceding vehicle is decreased in the order of the braking judgment equation designated by the curve L0, the friction braking start threshold equation designated by the curve L1, the engine braking start threshold equation designated by the curve L2, and the acceleration control completion threshold equation designated by the curve L3 in accordance with the magnitude of each offset value.

As shown in FIG. 1, a microcomputer is the vehicle control ECU 100. The microcomputer is generally composed of a central processing unit (CPU), a read only memory (ROM), a random access memory (RAM), an input/output unit (I/O unit), and a bus. Through the bus, the CPU, the ROM, the RAM and the I/O unit are connected to each other.

The vehicle control ECU 100 executes the preceding vehicle following driving control by using various types of devices which are connected together through the car-mounted LAN and etc.

The preceding vehicle following driving control is started when the driver of the own vehicle operates the operation switch unit SW80 and instructs the start of the preceding vehicle following driving control. Further, the preceding vehicle following driving control is completed when the driver of the own vehicle operates the operation switch unit SW80 in order to stop the execution of the preceding vehicle following driving control.

During the preceding vehicle following driving control, the vehicle control ECU 100 becomes various functional units capable of calculating a current compensated evaluation index value KdB_c (as a current value calculation unit), of calculating threshold values (as a threshold value calculation means), of calculating a safe vehicle distance (as a safe vehicle distance calculation unit), and of executing a speed control of the own vehicle (as a speed control unit). Those functions correspond to the units written in the claims.

A description will now be given of the preceding vehicle following driving control executed by the preceding vehicle following driving control device according to the exemplary embodiment in detail.

(Function as the Current Value Calculation Unit)

The vehicle control ECU 100 successively calculates the current compensated evaluation index value KdB_c during the execution of the preceding vehicle following driving control. The vehicle control ECU 100 calculates the compensated evaluation index value KdB_c on the basis of the evaluation index calculation equation shown in FIG. 2. Therefore it is necessary to determine the relative speed Vr, the preceding vehicle speed Vp, and the vehicle distance D between the own vehicle and the preceding vehicle before calculation of the current compensated evaluation index value KdB_c. The relative speed Vr and the preceding vehicle speed Vp can be determined on the basis of the detection signals obtained by the radar 70, for example. The preceding vehicle speed Vp is calculated on the basis of the relative speed Vr and the vehicle speed Vo of the own vehicle obtained by the VSC_ECU 10.

The vehicle control ECU 100 successively calculates the current compensated evaluation index value KdB_c by entering the relative speed Vr and the vehicle speed Vo of the own vehicle into the equation (2) previously explained.

(Function as the Threshold Value Calculation Unit)

The vehicle control ECU 100 successively calculates the three threshold value, namely, the friction braking start threshold value, the engine braking start threshold value and the acceleration control completion threshold value during the execution of the preceding vehicle following driving control on the basis of using the equation of calculating the friction braking start threshold value, the equation of calculating the engine braking start threshold value, the equation of calculating the acceleration control completion threshold value and the current vehicle distance D.

(Function as the Safe Vehicle Distance Calculation Unit)

During the execution of the preceding vehicle following driving control, the vehicle control ECU 100 becomes the safe vehicle distance calculation unit which successively calculates the safe vehicle distance Dt. The safe vehicle distance Dt is a vehicle distance D which is calculated when the relative speed Vr is zero (that is, the own vehicle does not reach the preceding vehicle) in the evaluation index calculation equation (2) as previously described. The equation of the safe vehicle distance Dt is obtained by using the equation (2) of calculating the evaluation index and the equation of calculating the acceleration control completion threshold value.

When a=0.2, the equation (2) can be transformed to the following equation (5). When the own vehicle approaches the preceding vehicle, the value Vr takes a negative value.

$$Vr = -2.5 \times D^3 \times 10^{\frac{KdB\_c}{10}-8} + 0.2 \times Vp. \tag{5}$$

When b=−22.66, c=74.71 in the equation (4) of calculating the acceleration control completion threshold value, and when the equation (4) is inserted to the value KdB_c, the following equation (6) can be obtained.

$$Vr = -2.5 \times D^3 \times 10^{\frac{-22.66 \times \log_{10} D + 74.71 + \Delta c}{10}-8} + 0.2 \times Vp. \tag{6}$$

Since the collision avoidance time TTC can be expressed by TTC=D/Vr, the value TTC becomes infinity when Vr=0. That is, when the safe vehicle distance Dt when Vr=0, the collision avoidance time TTC becomes infinity. When Vr=0 in the equation (6) and the equation (6) is transformed in logarithm, the following equation (7) capable of calculating the safe vehicle distance Dt is obtained. It is possible for the vehicle control ECU 100 to successively calculate the safe vehicle distance Dt by entering the vehicle speed of the preceding vehicle into the equation (7).

$$Dt = 10^{\frac{80+10 \times \log_{10} 0.08 + 10 \times \log_{10} Vp - 74.71 - \Delta c}{-22.66+30}}. \tag{7}$$

(Function as the Speed Control Unit)

During the execution of the preceding vehicle following driving control, the vehicle control ECU 100 becomes the speed control unit which compares the current vehicle distance D with the current safe vehicle distance Dt. When the comparison result indicates that the current vehicle distance D is smaller than the current safe vehicle distance Dt, the vehicle control ECU 100 instructs the VSC_ECU 10 to generate and apply the friction braking regardless of the current compensated evaluation index value KdB_c.

On the other hand, when the comparison result indicates that the current vehicle distance D is longer (or larger) than the current safe vehicle distance Dt, the vehicle control ECU 100 compares the current compensated evaluation index value KdB_c with each of the friction braking start threshold value, the engine braking start threshold value and the acceleration control completion threshold value. The comparison result has one selected from the following cases (a), (b), (c) and (d).

(a) The current compensated evaluation index value KdB_c is larger than the friction braking start threshold value;
(b) The current compensated evaluation index value KdB_c is between the friction braking start threshold value and the engine braking start threshold value;
(c) The current compensated evaluation index value KdB_c is between the braking start threshold value and the acceleration control completion threshold; and
(d) The current compensated evaluation index value KdB_c is lower than the acceleration control completion threshold.

The vehicle control ECU 100 generates and applies the friction braking when the comparison result indicates the case (a), the vehicle control ECU 100 generates and applies the engine braking when the case (b), the vehicle control ECU 100 drives the own vehicle at a constant speed when the case (c), and the vehicle control ECU 100 accelerates the own vehicle when the case (d).

The acceleration GDP to increase or decrease the vehicle speed of the own vehicle can be calculated by the following equation (8), for example.

$$G_{Dp} = (Vr\_p - Vr\_t)/T \tag{8},$$

where Vr_p designates a current relative speed of the own vehicle to the preceding vehicle, Vr_t indicates a target relative speed. The target relative speed Vr_t is obtained by using the braking judgment equation, namely, by entering the current compensated evaluation index value KdB_c at the current vehicle distance D into the equation (2). The variable T is a divider which is used for converting a difference between the current relative speed Vr_p of the own vehicle and the target relative speed Vr_t. That is, the variable T is optionally set.

(Concrete Examples)

Next, a description will now be given of various concrete examples of the preceding vehicle following driving control device according to the exemplary embodiment of the present invention.

Prior to the explanation of the concrete examples of the preceding vehicle following driving control according to the exemplary embodiment of the present invention, a conventional preceding vehicle following driving control will be explained.

Figure 3A:
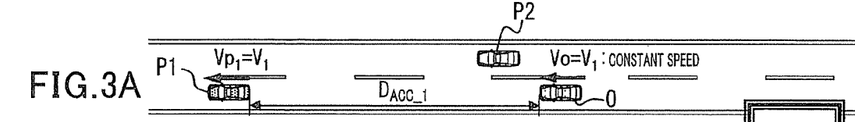
FIG. 3A, FIG. 3B and FIG. 3C are views, each showing a relative position between the own vehicle O, a preceding vehicle P1, a preceding vehicle P2, and the preceding vehicle P2 cuts in between the own vehicle and the preceding vehicle P1 under a conventional preceding vehicle following driving control.
Figure 3B:
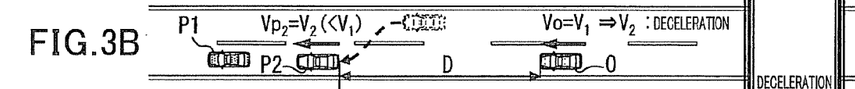
Figure 3C:
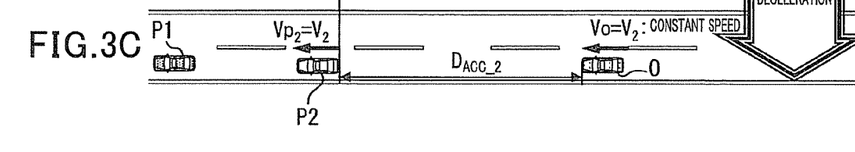

FIG. 3A, FIG. 3B and FIG. 3C, each showing a relative position lane between the own vehicle O, a preceding vehicle P1, a preceding vehicle P2. The preceding vehicle P2 cuts in between the own vehicle and the preceding vehicle P1 under a conventional preceding vehicle following driving control.

In the conventional preceding vehicle following driving control shown in FIG. 3A to FIG. 3C, the preceding vehicle P1 is running in front of the own vehicle O and the vehicle distance between the own vehicle O and the preceding vehicle P1 is $D_{ACC\_1}$. The vehicle distance $D_{ACC\_1}$ is equal to the set vehicle distance. The preceding vehicle P1 is running at a vehicle speed $V_1$. The own vehicle O following the preceding vehicle P1 is running at the same vehicle speed $V_1$.

When another vehicle as a preceding vehicle P2 cuts in between the own vehicle O and the preceding vehicle P1, the drive state shown in FIG. 3A is shifted to the drive state shown in FIG. 3B. In the drive state shown in FIG. 3B, the preceding vehicle following driving control device in the own vehicle O follows the preceding vehicle P2. In this case, the vehicle distance obtained on the basis of the preceding vehicle P1 becomes smaller than the set vehicle distance. Because the conventional preceding vehicle following driving control device executes the vehicle control of the own vehicle so that an actual vehicle distance D becomes the set vehicle distance, the own vehicle O is decelerated when the vehicle distance D is smaller than the set vehicle distance. When the vehicle distance $D_{ACC\_2}$, which is obtained on the preceding vehicle P2, is expanded to the set vehicle distance, the own vehicle O is controlled so that the own vehicle O is running at the same speed V2 of the preceding vehicle P2, as shown in FIG. 3C.

A description will now be given of the preceding vehicle following driving control according to the exemplary embodiment of the present invention.

FIG. 4A to FIG. 4F are views, each showing an example of the own vehicle O controlled by the preceding vehicle following driving control device according to the exemplary embodiment of the present invention. A current compensated evaluation index value KdB_c becomes within a constant speed zone even if another vehicle P2 cuts in between the own vehicle and the preceding vehicle.

Figure 4A:
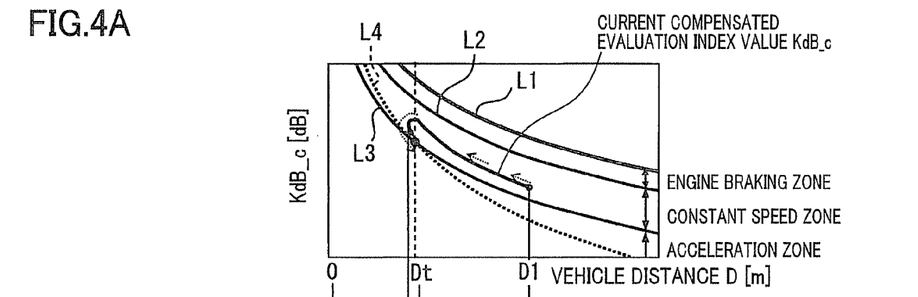
Figure 4B:
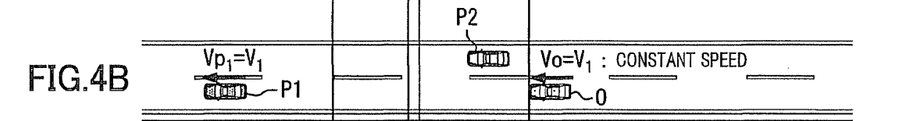
Figure 4C:
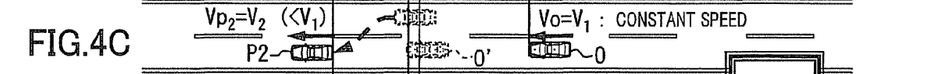

FIG. 4A to FIG. 4F show a case in which the compensated evaluation index value KdB_c becomes within the constant speed zone by the presence of the preceding vehicle P2 which cuts in between the own vehicle O and the preceding vehicle P1. FIG. 4A to FIG. 4F have the same dimension of the vehicle distance D designated by the lateral axis. In FIG. 4B to FIG. 4F, the straight lines extended from the own vehicle O to the view shown in FIG. 4A designate the current vehicle distance D. Further, in FIG. 4B to FIG. 4E the own vehicle designated by a dotted line indicates the own vehicle O in the following Figure (for example, the own vehicle O in FIG. 4C is shown by the own vehicle O indicated by the dotted line in FIG. 4B). Those conditions in FIG. 4A to FIG. 4F are applied to the cases shown in FIG. 5A to FIG. 8C which will be explained later.

FIG. 4B and FIG. 4C correspond to vehicle conditions shown in FIG. 3A and FIG. 3B. That is, the preceding vehicle P2 cuts in between the own vehicle O and the preceding vehicle P2, and the preceding vehicle following driving control switches the control target from the preceding vehicle P1 to the preceding vehicle P2.

By the way, in the conventional case shown in FIG. 3A to FIG. 3C, the conventional preceding vehicle following driving control promptly decelerates the own vehicle O when the preceding vehicle P2 cuts in between the own vehicle O and the preceding vehicle P1.

On the other hand, the preceding vehicle following driving control according to the exemplary embodiment does not promptly decelerate the own vehicle O. In the state shown in FIG. 4C, the vehicle distance D is D1, and the current compensated evaluation index value KdB_c is within the constant speed zone between the area designated by the engine braking start threshold curve L2 and the acceleration control completion threshold curve L3.

Because the current compensated evaluation index value KdB_c in the state shown in FIG. 4C is within the constant speed zone, the own vehicle O continues to drive at the same speed $V_1$, namely, at a constant speed toward the preceding vehicle P2. As a result, the own vehicle O approaches the preceding vehicle P2 until the vehicle distance D between them reaches the safe vehicle distance Dt. The curve L4 shown in FIG. 4A is a curve obtained by the equation (5) when the relative vehicle speed Vr=0. That is, the safe vehicle distance Dt is the distance D which is a cross point between the curve L4 and the acceleration control completion threshold curve L3.

Figure 4D:
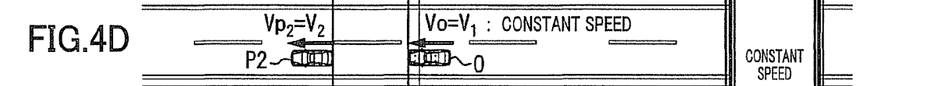
Figure 4E:
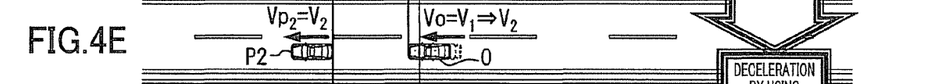
Figure 4F:
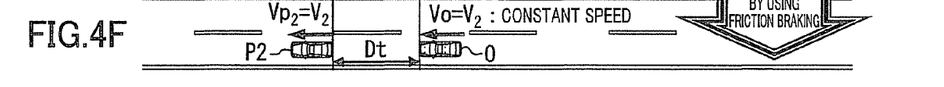

As shown in FIG. 4D, when the vehicle distance D exceeds the safe vehicle distance Dt, the vehicle control ECU 100 generates and applies friction braking in order to start the deceleration of the own vehicle O. When the vehicle speed of the own vehicle O is decelerated from the vehicle speed $V_1$ to the vehicle speed $V_2$ of the preceding vehicle P2 (see FIG. 4E), and the vehicle distance D becomes the safe vehicle distance Dt (see FIG. 4F), the vehicle control ECU 100 continues the own vehicle at the vehicle speed $V_2$ in order for the own vehicle O to drive at the constant vehicle speed $V_2$.

FIG. 5A to FIG. 5G show an example which is similar to the example shown in FIG. 4A to FIG. 4F when the current compensated evaluation index value KdB_c is close to the friction braking threshold value. In particular, the current compensated evaluation index value KdB_c in the example shown in FIG. 5A to FIG. 5G is close to the friction braking start threshold value, more than that in the example shown in FIG. 4A to FIG. 4F.

FIG. 5A to FIG. 5G are views showing the example of the own vehicle controlled by the preceding vehicle following driving control device according to the exemplary embodiment of the present invention, in which the current compensated evaluation index value KdB_c is more close to the friction braking start threshold value when compared with the example shown in FIG. 4A to FIG. 4F.

Figure 5A:
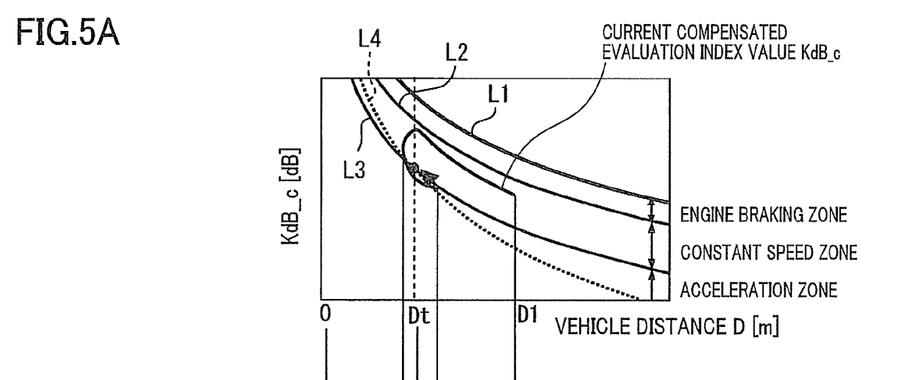
Figures 5B, 5C:
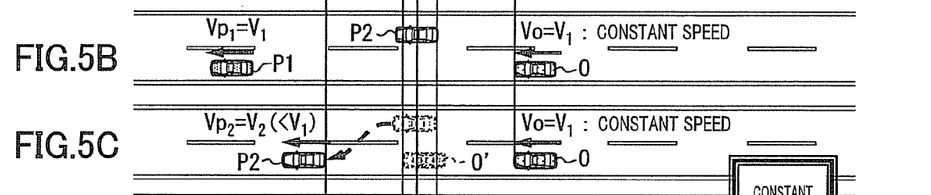
Figure 5D:
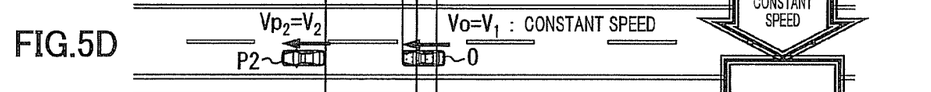
Figure 5E:
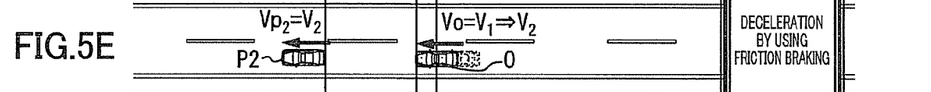

As shown in FIG. 5B, when the preceding vehicle P1 is switched to the preceding vehicle P2 when the preceding vehicle P2 cuts in between the own vehicle O and the preceding vehicle P1 shown in FIG. 5C, the vehicle distance D is decreased. However, because the current compensated evaluation index value KdB_c is within the constant speed zone, the vehicle control ECU 100 instructs the own vehicle O to drive at the constant vehicle speed V1. After this, when the vehicle distance D reaches the safe vehicle distance Dt shown in FIG. 5D, the vehicle control ECU 100 starts to generate and apply friction braking in order to decelerate the own vehicle O shown in FIG. 5E. During the period in which the vehicle distance D is smaller than the safe vehicle distance Dt, the vehicle control ECU 100 continues to apply the friction braking in order to decelerate the own vehicle O. This control decreases the own vehicle O to the vehicle speed V2 from the vehicle speed V1.

The case shown in FIG. 5A to FIG. 5G has a large overshoot which is larger than the case shown in FIG. 4A to FIG. 4F, and the vehicle distance D is temporarily larger than the safe vehicle distance Dt. In this case, the current compensated evaluation index value KdB_c becomes the acceleration zone.

Figure 5F:
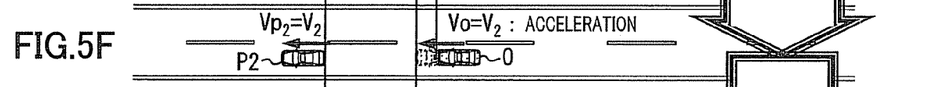
Figure 5G:
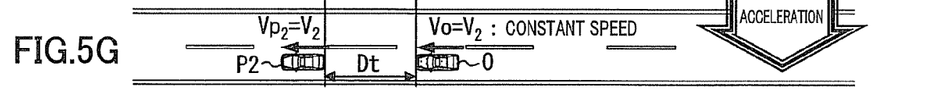

As shown in FIG. 5F, after the own vehicle O is accelerated again shown in FIG. 5F, when the vehicle distance D reaches the safe vehicle distance Dt and the vehicle speed Vo of the own vehicle becomes the vehicle speed V2, the own vehicle O drives at the constant vehicle speed shown in FIG. 5G.

FIG. 6A to FIG. 6G are views showing an example of the own vehicle O controlled by the preceding vehicle following driving control device according to the exemplary embodiment of the present invention, in which the current compensated evaluation index value KdB_c becomes the engine braking start threshold value by the presence of another vehicle (as the preceding vehicle P2) which cuts in between the own vehicle O and the preceding vehicle P1. That is, FIG. 6A to FIG. 6G show the example in which the current compensated evaluation index value KdB_c is within the engine braking zone when the preceding vehicle P1 is switched with the preceding vehicle P2 when the preceding vehicle P2 cuts in between the preceding vehicle P1 and the own vehicle.

That is, when another vehicle as the preceding vehicle P2 cuts in between the own vehicle O and the preceding vehicle P1 after the preceding vehicle P1 is running in front of the own vehicle O (shown in FIG. 6B), the preceding vehicle 2 is running in front of the own vehicle O. In this example, the vehicle distance D is decreased by the presence of the preceding vehicle P2 as shown in FIG. 6C.

Figure 6A:
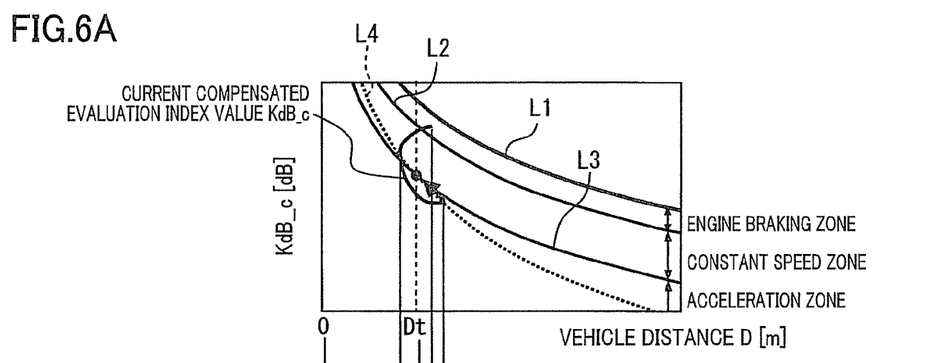
Figure 6B:
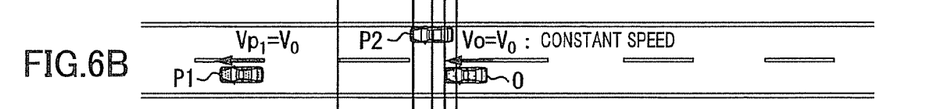
Figure 6C:
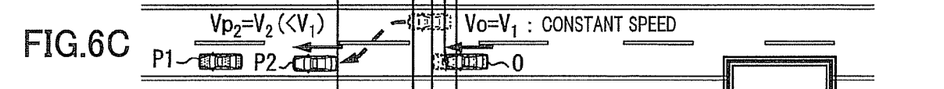

In the case shown in FIG. 6A to FIG. 6G, the current compensated evaluation index value KdB_c when the preceding vehicle P2 is running in front of the own vehicle O is within the engine braking zone as shown in FIG. 6A.

Figure 6D:
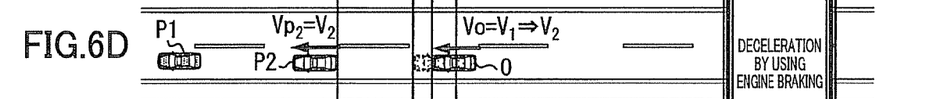
Figure 6E:
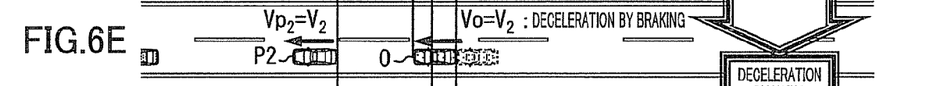
Figure 6F:
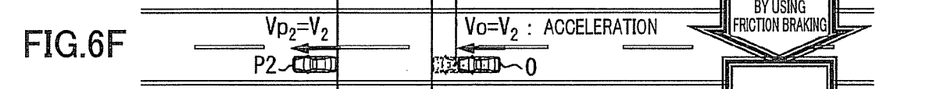
Figure 6G:
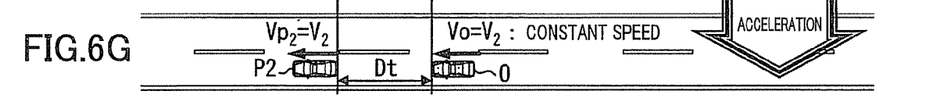

The vehicle control ECU 100 generates and applies engine braking in the own vehicle in order to start the deceleration of the vehicle speed Vo of the own vehicle O shown in FIG. 6D. After this, the vehicle distance D is decreased by the engine braking, and the vehicle distance D becomes shorter than the safe vehicle distance Dt. At this time, the friction braking is applied in the own vehicle O as shown in FIG. 6E. This makes it possible to expand or increase the vehicle distance D between the own vehicle O and the preceding vehicle P2. When the vehicle distance D is temporarily larger than the safe vehicle distance Dt, and the current compensated evaluation index value KdB_c is within the acceleration zone, the vehicle control ECU 100 instructs the own vehicle O to accelerate again as shown in FIG. 6F. Finally, the vehicle distance D becomes the safe vehicle distance Dt and the own vehicle O drives at the vehicle speed V2 by the re-acceleration to the own vehicle O. After this, the vehicle control ECU 100 instructs the own vehicle O to drive at a constant vehicle speed as shown in FIG. 6G.

FIG. 7A to FIG. 7G are views showing an example of the own vehicle controlled by the preceding vehicle following driving control device according to the exemplary embodiment of the present invention, in which a current compensated evaluation index value KdB_c exceeds the friction braking start threshold value by the presence of another vehicle which curs between the own vehicle and the preceding vehicle.

In the case shown in FIG. 7A to FIG. 7G, the current compensated evaluation index value KdB_c exceeds the friction braking start threshold value by the presence of another vehicle (as the preceding vehicle P2) which cuts in between the own vehicle O and the preceding vehicle P1.

After the preceding vehicle P1 is running in front of the own vehicle O (shown in FIG. 7B), when another vehicle (as the preceding vehicle P2) cuts in between the own vehicle O and the preceding vehicle P1, the preceding vehicle 2 is running in front of the own vehicle O. In this case, the vehicle distance D is further decreased by the presence of the preceding vehicle P2 as shown in FIG. 7C.

Figure 7A:
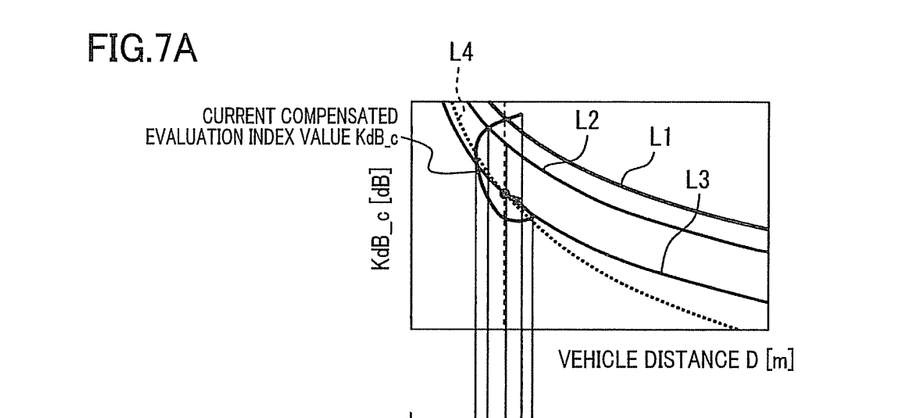
Figures 7B, 7C:
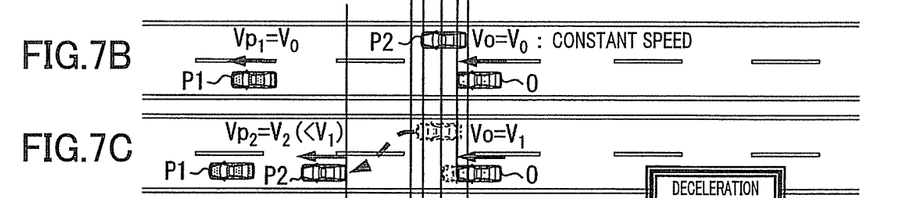
Figure 7D:
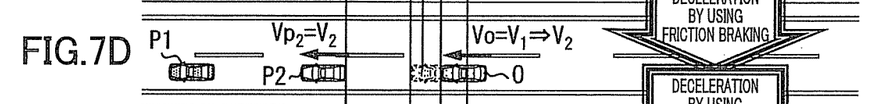

When the preceding vehicle P2 is running in front of the own vehicle O in the example shown in FIG. 7A to FIG. 7G, the current compensated evaluation index value KdB_c exceeds the friction braking start threshold value which is determined by the friction braking start threshold curve L1 as shown in FIG. 7A. Thereby, the vehicle control ECU 100 applies the friction braking in order to start the deceleration of the own vehicle O. The current compensated evaluation index value KdB_c enters the engine braking zone by the deceleration of the own vehicle O by the friction braking. However, because the vehicle distance D is shorter than the safe vehicle distance Dt, the vehicle control ECU 100 does not apply the engine braking in the own vehicle, and continues the application of the friction braking until the vehicle speed reaches the target vehicle speed V2.

Figure 7E:
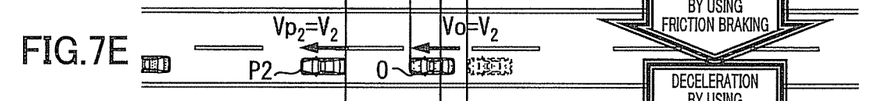
Figure 7F:
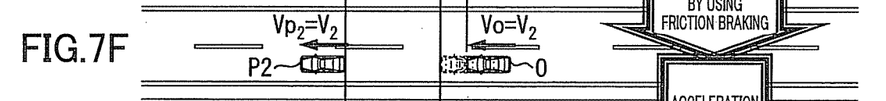
Figure 7G:
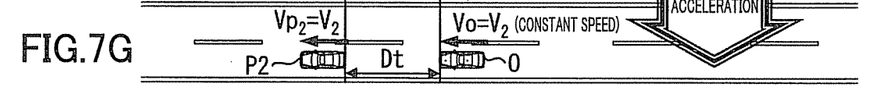

After this, the current compensated evaluation index value KdB_c becomes the constant vehicle speed zone. However, because the vehicle distance D is shorter than the safe vehicle distance Dt, the vehicle control ECU 100 continues the generation of the friction braking in the own vehicle O as shown in FIG. 7E. When the vehicle distance D exceeds the safe vehicle distance Dt, because the current compensated evaluation index value KdB_c is within the acceleration speed zone and because the vehicle speed of the own vehicle O is temporarily lower than the vehicle speed V2, the vehicle control ECU 100 temporarily accelerates the vehicle speed of the own vehicle O as shown in FIG. 7F. After this control, when the vehicle speed of the own vehicle O reaches the vehicle speed V2, the vehicle control ECU 100 instructs the own vehicle O to drive at a constant vehicle speed shown in FIG. 7G.

FIG. 8A to FIG. 8D are views showing an example of controlling the own vehicle O by the preceding vehicle following driving control device according to the exemplary embodiment of the present invention, in which the own vehicle O is decelerated by using the friction braking within the safe vehicle distance between own vehicle O and the preceding vehicle P2.

That is, FIG. 8A to FIG. 8D explain the example in which the preceding vehicle following driving control device decelerates the own vehicle O by using the friction braking when the own vehicle O is running within the safe vehicle distance Dt.

Figure 8A:
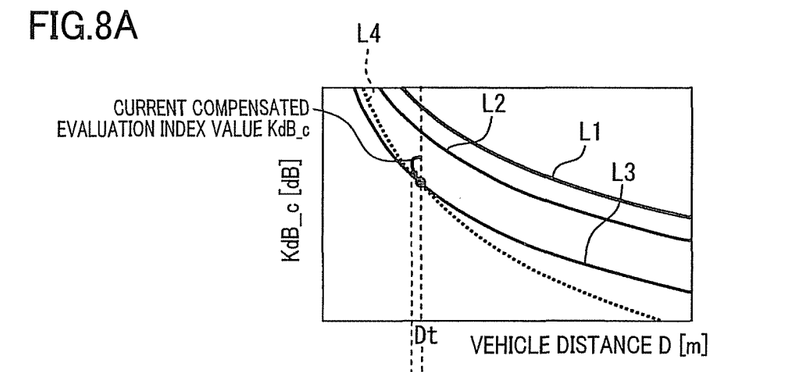
Figure 8B:
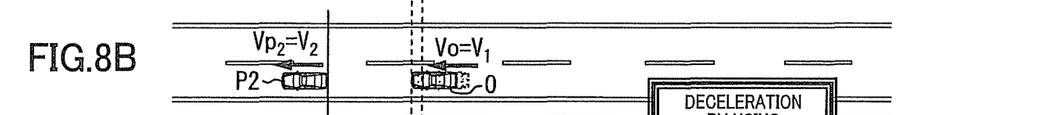
Figure 8C:
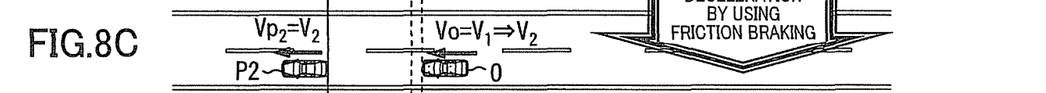
Figure 8D:
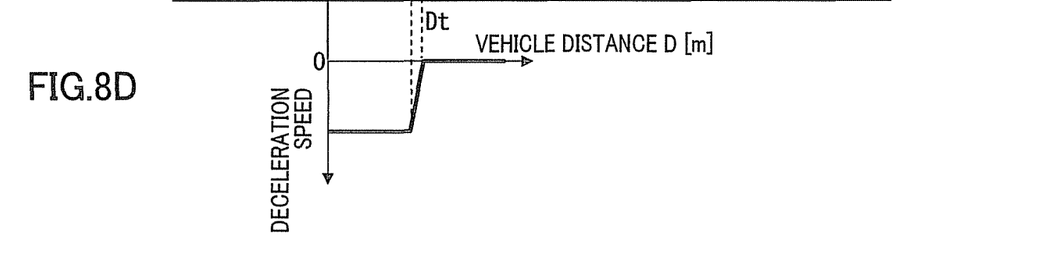

When there is a large difference between the safe vehicle distance Dt and the current vehicle distance D, the vehicle control ECU 100 decelerates the vehicle speed of the own vehicle O by a constant deceleration speed. When the vehicle distance D is increased close to the safe vehicle distance Dt, the vehicle control ECU 100 decelerates the vehicle speed of the own vehicle O at a deceleration speed so that the absolute value of the difference is decreased on the basis of the current vehicle distance D.

As previously described in detail, according to the preceding vehicle following driving control of the exemplary embodiment of the present invention, the vehicle control ECU 100 successively calculates the friction braking start threshold value, the engine braking start threshold value and the acceleration control completion threshold value by using the friction braking start threshold equation, the engine braking start threshold equation and the acceleration control completion threshold equation.

In the preceding vehicle following driving control, the vehicle control ECU 100 uses as the constant speed zone of the own vehicle O between the engine braking start threshold value and the acceleration control completion threshold value. Further, the vehicle control ECU 100 executes a constant vehicle speed control of the own vehicle O when the current compensated evaluation index value KdB_c is within the constant speed zone. Because the constant speed control decreases a frequency of accelerating the own vehicle O, this makes it possible to decrease fuel consumption of the own vehicle O. Further, because the constant speed control decreases a frequency of executing the deceleration to the own vehicle O, it is possible to provide the good preceding vehicle following control when the preceding vehicle P2 which cuts in between the own vehicle O and the preceding vehicle P1 is accelerated or when the preceding vehicle P2 is accelerated again after decelerated because the own vehicle can follow the preceding vehicle P2 by a small acceleration.

The preceding vehicle following driving control according to the exemplary embodiment can control the two type brakings, the friction braking and the engine braking. When the driver drives the own vehicle O, the driver usually drives the own vehicle O by selecting one of the friction braking and the engine braking. Accordingly, the preceding vehicle following driving control according to the exemplary embodiment can provide safe and comfortable driving.

According to the preceding vehicle following driving control of the exemplary embodiment, the vehicle control ECU 100 successively calculates the safe vehicle distance Dt. When the current vehicle distance D is shorter than the calculated safe vehicle distance Dt, the vehicle control ECU 100 always applies the friction braking. Because this makes it possible to quickly increase the vehicle distance D until it becomes the safe vehicle distance Dt, it is possible to increase the safety of the own vehicle O when the vehicle distance D is shorter than the safe vehicle distance Dt.

Because the driver of the own vehicle O can change the offset value Δc of the threshold equation in the preceding vehicle following driving control according to the exemplary embodiment, the driver of the own vehicle O can optionally adjust the timing when the braking control is initiated and at the completion of the acceleration control.

Other Features and Effects of the Exemplary Embodiment of the Present Invention

In another aspect of the exemplary embodiment of the present invention, the device capable of executing the preceding vehicle following driving control uses two types of threshold values as the braking start threshold value. That is, the braking start threshold value is composed of a friction braking start threshold value and an engine braking start threshold value. The memory unit stores the braking start threshold value equation. The braking start threshold value equation has a friction braking start threshold value equation and an engine braking start threshold value equation. The friction braking start threshold value equation indicates a relationship between the compensated evaluation index value KdB_c and the vehicle distance at a timing when a friction braking is applied. The friction braking start threshold value equation is obtained by adding a first braking offset value into the braking judgment equation. The first braking offset value decreases the compensated evaluation index value KdB_c which is the value at the same vehicle distance.

On the other hand, the engine braking start threshold value equation indicates a relationship between the compensated evaluation index value KdB_c and the vehicle distance at a timing when engine braking is applied in the own vehicle. The engine braking start threshold value equation is obtained by adding a second braking offset value to the braking judgment equation. The second braking offset value decreases the compensated evaluation index value KdB_c, more than the decrease of the compensated evaluation index value KdB_c by using the braking offset value, in a case having the same vehicle distance.

The threshold value calculating unit calculates three types of threshold values. That is, the threshold value calculating unit calculates a friction braking start threshold value on the basis of the friction braking start threshold value equation and the current vehicle distance. The threshold value calculating unit calculates an engine braking start threshold value on the basis of the engine braking start threshold value equation and the current vehicle distance. Finally, the threshold value calculating unit calculates an acceleration control completion threshold value on the basis of the acceleration control completion threshold value equation and the current vehicle distance.

The speed control unit compares the current compensated evaluation index value KdB_c calculated by the current value calculation unit with the friction braking start threshold value, the engine braking start threshold value, and the acceleration control completion threshold value calculated by the threshold value calculation unit. In particular, the control unit applies the friction braking in the own vehicle when the current compensated evaluation index value KdB_c is higher than the friction braking start threshold value. The control unit applies the engine braking in the own vehicle when the current compensated evaluation index value KdB_c is within the friction braking start threshold value and the engine braking start threshold value.

The control unit executes the acceleration control when the current compensated evaluation index value KdB_c is lower than the acceleration control completion threshold value. The control unit instructs the own vehicle to drive at a constant vehicle speed when the current compensated evaluation index value KdB_c is within the engine braking start threshold value and the acceleration control completion threshold value.

According to the exemplary embodiment of the present invention, the device uses one of two types of braking, namely, uses one selected from the friction braking and the engine braking on the basis of the current compensated evaluation index value KdB_c. Because the driver of the own vehicle selects in general one of the friction braking and the engine braking depending on the situation, the device provides a comfort speed deceleration control and allows the driver of the own vehicle to have the preceding vehicle following driving control without having uncomfortable feeling.

As another aspect of the exemplary embodiment of the present invention, the device further has a safe vehicle distance calculation unit. The safe vehicle distance calculation unit successively calculates a current safe vehicle distance on the basis of a safe vehicle distance calculation equation and a current vehicle speed of the preceding vehicle which currently drives in front of the own vehicle. The safe vehicle distance calculation equation is obtained by using an evaluation index calculation equation and the acceleration control completion threshold value equation. The current safe vehicle distance is calculated by using the safe vehicle distance calculation equation and the current speed of the preceding vehicle. The compensated evaluation index value KdB_c is calculated on the basis of the evaluation index calculation equation. The speed control unit applies the friction braking in the own vehicle when the current vehicle distance between the own vehicle and the preceding vehicle is shorter than the current safe vehicle distance regardless of the current compensated evaluation index value KdB_c.

According to the exemplary embodiment of the present invention, the device always applies the friction braking when the current vehicle distance is shorter than the safe vehicle distance. This control makes it possible to increase the stability in driving of the own vehicle when the actual or current vehicle distance is shorter than the safe vehicle distance because the vehicle distance between the own vehicle and the preceding vehicle is speedily expanded to the safe vehicle distance.

In the device as another aspect of the exemplary embodiment of the present invention, the driver of the own vehicle changes the braking offset value and the acceleration offset value. When the offset value is changed, it is possible to change the timing when the braking control is initiated or to change the completion time of the acceleration control. Because the driver of the own vehicle can change the offset value, it is possible for the driver of the own vehicle to have the optimum timing to start the braking control and to complete the acceleration control.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A device for executing a preceding vehicle following driving control on the basis of a compensated evaluation index value KdB_c, the compensated evaluation index value KdB_c showing a state of a vehicle distance between an own vehicle and a preceding vehicle, the preceding vehicle running in front of the own vehicle, the compensated evaluation index value KdB_c being increased according to increase of a relative speed, the relative speed indicates a rate of a vehicle speed of the own vehicle to approach the preceding vehicle, and the compensated evaluation index value KdB_c being increased according to decrease of the vehicle distance between the own vehicle and the preceding vehicle, and an increasing gradient of the compensated evaluation index value KdB_c to a decreasing gradient of the vehicle distance being high according to decrease of the vehicle distance, the device comprising:

a memory unit for storing a braking start threshold value equation and an acceleration control completion threshold value equation, the braking start threshold value equation indicating a relationship between the compensated evaluation index value KdB_c and the vehicle distance at a timing when a braking control is initiated, the braking start threshold value equation being obtained by adding a braking offset value to a braking judgment equation, the braking offset value decreasing the compensated evaluation index value KdB_c in a case having the same vehicle distance, the braking judgment equation indicating a relationship between the compensated evaluation index value KdB_c and the vehicle distance at a timing when a driver of the own vehicle executes braking operation, and the acceleration control completion threshold value equation indicating a relationship between the compensated evaluation index value KdB_c and the vehicle distance at a completion of acceleration control, the acceleration control completion threshold value equation being obtained by adding an acceleration offset value to the braking judgment equation, the acceleration offset value decreasing the compensated evaluation index value KdB_c, more than the decrease of the compensated evaluation index value KdB_c by using the braking offset value, in a case having the same vehicle distance;

a current value calculation unit for successively calculating a current value of the compensated evaluation index value KdB_c;

a threshold value calculating unit for calculating the braking start threshold value by using the braking start threshold value equation and a current vehicle distance, and for calculating the acceleration control completion threshold value by using the acceleration control completion threshold value equation and the current vehicle distance; and a speed control unit for comparing the current compensated evaluation index value KdB_c calculated by the current value calculation unit with the braking start threshold value calculated by the threshold value calculation unit and the acceleration control completion threshold value calculated by the threshold value calculation unit, the speed control unit applying a braking force in the own vehicle when the comparison result indicates that the current compensated evaluation index value KdB_c is larger than the braking start threshold value, the speed control unit adjusting the acceleration of the own vehicle when the comparison result indicates that the current compensated evaluation index value KdB_c is smaller than the acceleration control completion threshold value, and the speed control unit driving the own vehicle at a constant speed when the current compensated evaluation index value KdB_c is within the braking start threshold value and the acceleration control completion threshold value.

2. The device according to claim 1, wherein the braking start threshold value equation stored in the memory unit is composed of a friction braking start threshold value equation and an engine braking start threshold value equation, wherein the friction braking start threshold value equation indicates a relationship between the compensated evaluation index value KdB_c and the vehicle distance at a timing when a friction braking is applied, the friction braking start threshold value equation is obtained by adding a first braking offset value to the braking judgment equation, the first braking offset value decreases the compensated evaluation index value KdB_c in a case having the same vehicle distance, the engine braking start threshold value equation indicates a relationship between the compensated evaluation index value KdB_c and the vehicle distance at a timing when engine braking is applied in the own vehicle, the engine braking start threshold value equation is obtained by adding a second braking offset value to the braking judgment equation, the second braking offset value decreases the compensated evaluation index value KdB_c, more than the decrease of the compensated evaluation index value KdB_c by using the first braking offset value, in a case having the same vehicle distance, the threshold value calculating unit calculates a friction braking start threshold value on the basis of the friction braking start threshold value equation and the current vehicle distance, calculates an engine braking start threshold value on the basis of the engine braking start threshold value equation and the current vehicle distance, and calculates an acceleration control completion threshold value on the basis of the acceleration control completion threshold value equation and the current vehicle distance, and the speed control unit compares the current compensated evaluation index value KdB_c calculated by the current value calculation unit with the friction braking start threshold value, the engine braking start threshold value, and the acceleration control completion threshold value calculated by the threshold value calculation unit, and the control unit:

applies the friction braking when the current compensated evaluation index value KdB_c is higher than the friction braking start threshold value;

applies the engine braking when the current compensated evaluation index value KdB_c is within the friction braking start threshold value and the engine braking start threshold value;

executes the acceleration control to adjust the acceleration of the own vehicle when the current compensated evaluation index value KdB_c is lower than the acceleration control completion threshold value; and instructs the own vehicle to drive at a constant vehicle speed when the current compensated evaluation index value KdB_c is within the engine braking start threshold value and the acceleration control completion threshold value.

3. The device according to claim 2, further comprising a safe vehicle distance calculation unit for successively calculating a current safe vehicle distance on the basis of a safe vehicle distance calculation equation and a current vehicle speed of the preceding vehicle which currently drives in front of the own vehicle, wherein the safe vehicle distance calculation equation is obtained by using an evaluation index calculation equation and the acceleration control completion threshold value equation, the current safe vehicle distance is calculated by using the safe vehicle distance calculation equation and the current speed of the preceding vehicle, the compensated evaluation index value $KdB\_c$ is calculated on the basis of the evaluation index calculation equation, and the speed control unit applies the friction braking in the own vehicle when the current vehicle distance between the own vehicle and the preceding vehicle is shorter than the current safe vehicle distance regardless of the current compensated evaluation index value $KdB\_c$.

4. The device according to claim 1, wherein the driver of the own vehicle changes the braking offset value and the acceleration offset value.

* * * * *